United States Patent [19]
Reijonen et al.

[11] 3,873,256
[45] Mar. 25, 1975

[54] CHEESE MOULD

[75] Inventors: Olavi Reijonen; Roland Gabriel Robez; Lauri Kostiainen, all of Helsinki, Finland

[73] Assignee: MKT-tehtaat Oy, Helsinki, Finland

[22] Filed: May 22, 1973

[21] Appl. No.: 362,866

[30] Foreign Application Priority Data
May 24, 1972  Austria .............................. 4482/72

[52] U.S. Cl. ................... 425/84, 425/441, 249/162, 249/113
[51] Int. Cl. ............................................ A23c 19/02
[58] Field of Search ........ 425/441, 84; 249/66, 141, 249/113, 162; 99/495

[56] References Cited
UNITED STATES PATENTS

| | | | |
|---|---|---|---|
| 2,460,167 | 1/1949 | Carlsen ......................... | 249/162 X |
| 2,736,942 | 3/1956 | Dudley ........................... | 249/141 X |
| 3,298,656 | 1/1967 | Zastrow ......................... | 249/162 X |

*Primary Examiner*—Francis S. Husar
*Assistant Examiner*—David S. Safran
*Attorney, Agent, or Firm*—Toren, McGeady and Stanger

[57] ABSTRACT

Rectangular, large cheese mould, consisting of a box-like body and wherein the space intended for the cheese is confined by side strainer plates and bottom strainer plates, and wherein one end of the mould has been constructed to constitute a door, through which the bottom strainer plates and the cheese bolster resting on these may be extracted from the mould. The side strainer plates are connected with the body by the aid of guiding means which force the side strainer plates to move away from the cheese bolster immediately when one commences to withdraw the latter from the mould.

3 Claims, 6 Drawing Figures

PATENTED MAR 25 1975 3,873,256

CHEESE MOULD

The initial phase in cheese-making is accomplished by coagulating the curd in the cheese kettle. The cheese mix, which is thus understood to consist of curd and whey, is discharged from the cheese kettle into the cheese mould. The cheese mould retains the curd, letting the whey escape. The removal of whey is assisted by pressing. After the whey has been drained, the cheese is removed from the mould.

No difficulties are encountered in removing the cheese from a small mould, but recently the use of large cheese moulds, having rectangular shape and a length of several metres, has been proposed. The present invention concerns such a rectangular, large cheese mould consisting of a box-like body and wherein the space intended to be occupied by the cheese is confined by lateral strainer plates and by bottom strainer plates, and wherein one end of the mould has been constructed to constitute a door, through which the bottom strainer plates and the cheese bolster resting on these can be extracted from the mould.

In a cheese mould of this kind, the side strainer plates cause difficulties when the cheese bolster is withdrawn from the mould. The side strainer plates must not be stationary, because it cannot be permitted that the cheese bolster rubs against the strainer plates when it is withdrawn. In order to avoid this drawback, for instance, the Austrian Pat. No. 288,768 discloses a cheese mould wherein the side strainer plates are loose and emerge from the mould simultaneously with the bottom strainer plates and the cheese bolster resting on these. With this design of prior art, however, there is associated the drawback that the handling of the loose side strainer plates and their reinsertion in the mould are highly inconvenient.

The aim of the present invention is to eliminate the drawbacks mentioned and to provide a cheese mould wherein the cheese bolster does not rub against the side strainer plates when it is withdrawn and wherein, on the other hand, the side strainer plates do not emerge together with the cheese bolster when the latter is extracted from the cheese mould. The invention is characterized in that the side strainer plates are connected with the body by the aid of guiding means, which force the side strainer plates to move in a direction away from the cheese bolster as soon as one begins to withdraw the latter from the mould. The invention is based on the fact that there occurs friction between the cheese bolster and the side strainer plates, and which is increased by the circumstance that cheese matter has entered the holes in the strainer plate. Now when the cheese bolster is withdrawn from the mould, the side plates tend to follow along as a result of friction. But since the side strainer plates are connected to the body by guiding means, they cannot follow along with the cheese bolster but are guided to separate from it.

According to a favourable embodiment of the invention, the guiding means are slides attached to the side strainer plates, the free ends of which are directed obliquely outwardly in the direction pointing towards the door and which have guides affixed to the body of the mould. The guides may then consist of two lateral guides and a bracket connecting them, which has been affixed to the body of the mould and upon the upper surface of which the slide rests. In this embodiment, the motion of the side strainer plates can be arranged in an exceedingly simple manner to be such that they, in addition to separating from the cheese bolster, also move upwardly away from the bottom strainer plates. This embodiment is characterized in that the lower surface of the slide is obliquely ascending in the direction towards the free end of the slide. Since in this way the side strainer plates move away from the bottom strainer plates these do not rub together when the cheese bolster is extracted. On the other hand, it is then easy to reinsert the bottom strainer plates in the cheese mould after completed withdrawal of the cheese bolster.

Another favourable embodiment of the invention is characterized in that the guiding means are pivoted arms, pivotally attached by one end to the body of the mould and by their opposite end, similarly, to the side strainer plates. This embodiment operates, in principle, as has been described. The upward ascent of the side strainer plates away from the bottom strainer plates is accomplished in that one or the other end of the pivoted arm is connected to its pivot pin by a helical surface, e.g., by a screw thread.

The invention is described hereinbelow by the aid of two examples, with reference to the attached drawing, wherein FIG. 1 shows a cheese mould according to the invention, seen from above;

Figures 3, 5, 6:
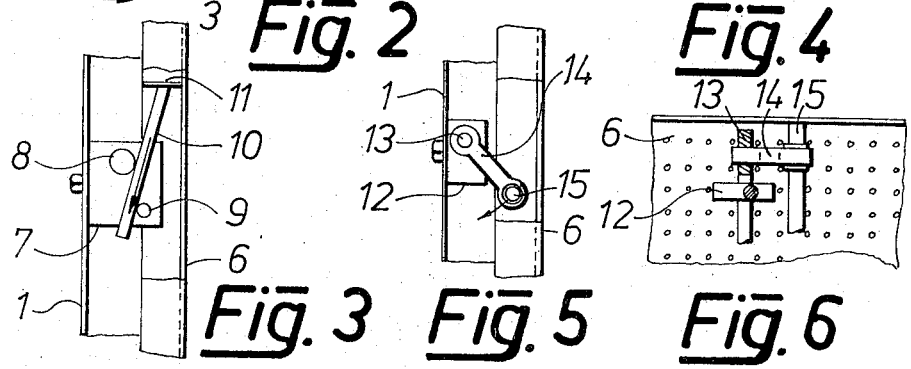
FIG. 3 shows the section along line III—III in FIG. 2.

FIG. 5 corresponds to FIG. 3 and shows another embodiment of the invention; and

Figure 1:
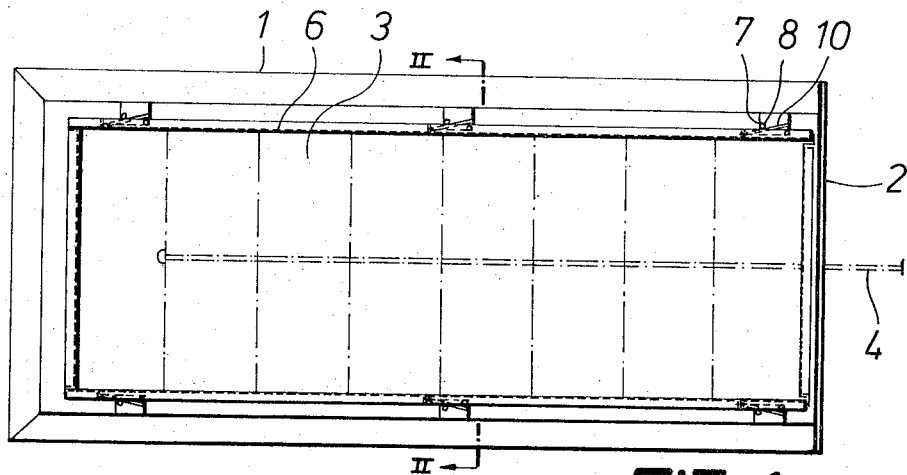
Figures 2, 4:
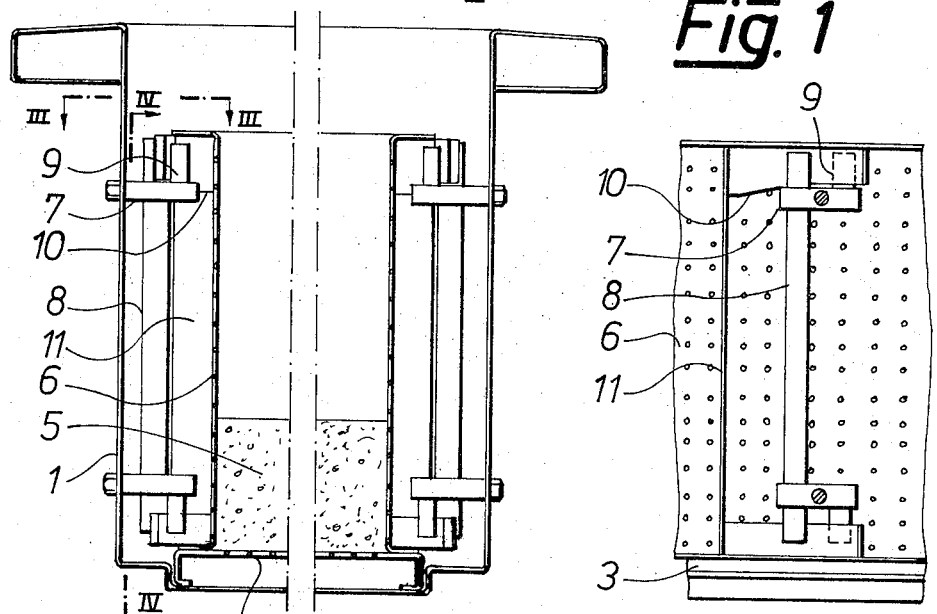
FIG. 2 shows the section along line II—II in FIG. 1.
FIG. 4 shows the section along line IV—IV in FIG. 2.

FIG. 6 corresponds to FIG. 4, showing the same embodiment as FIG. 5.

In FIGS. 1 to 4, the reference numeral 1 indicates the box-like body of a large, rectangular cheese mould. One end of the mould has been shaped to constitute a door 2, which is removable e.g., by lifting. On the bottom of the mould, rectangular loose bottom strainer plates 3 have been placed. To the bottom plate most distant from the door 2 a rope 4 has been attached, by the aid of which the bottom strainer plates and the cheese bolster resting upon them, 5, may be withdrawn from the mould. To exert the necessary traction, one may employ, for instance, a suitable winch.

The side strainer plates 6 have been connected with the body 1 of the mould in a peculiar manner. To this purpose, two brackets 7, disposed one above the other, have been screwed to the body. The brackets 7 are mutually connected by a rod 8 projecting over the upper and under the lower bracket. Furthermore, to each bracket 7 a pin 9 has been attached, projecting upwardly from the upper and downwardly from the lower bracket. The ends of the rod 8 and the pins 9 constitute lateral guides for slides 10, attached to vertical braces 11 on the side strainer plates 6. The free ends of the slides 10 point obliquely outwardly in the direction towards the door 2. As best seen from FIG. 4, the lower surface of the upper slide 10 is obliquely ascending in the direction towards the free end of the slide.

In FIG. 2 that position has been shown wherein the cheese mix has been introduced into the mould. The whey has drained off through the bottom strainer plates 3 and side strainer plates 6, whereby the cheese bolster 5 has remained. The cheese bolster may be pressed by the aid of a press plate (not depicted) from above, which plate has the same size as the mould.

When the door 2 of the mould is opened and withdrawal of the bottom strainer plates and of the cheese bolster 5 resting thereupon from the mould commences, the side strainer plates 6 tend to follow along, owing to friction. However, they are immediately forced apart from the cheese bolster 5 by the slides 10, whereby the cheese bolster and side strainer plates are no longer in contact. As best seen from FIG. 4, the bevelled lower surface of the upper slide 10 exerts an effect such that the side strainer plate 6 is raised clear of the bottom strainer plate 3.

In FIGS. 5 and 6 another embodiment has been presented. To the box-like body 1 of the mould brackets 12 have been screwed. Each bracket has a pivot pin 13, on which a pivoted arm 14 is carried. The opposite end of the pivoted arm 14 is carried by a pivot pin 15 attached to the side strainer plate 6. As can be seen from FIG. 6, the pivoted arm 14 has been fitted on the pivot pin 13 affixed to the bracket 12, by means of a thread arrangement. It is hereby achieved that the pivoted arm 14, in its motion when the cheese bolster is withdrawn from the mould, simultaneously rises upwardly and lifts the side strainer plate 6 clear of the bottom strainer plate.

It is obvious to one skilled in the art that different embodiments of the invention may vary within the scope of the claims set forth below. For instance, the strainer plates 6 may have a length equal to that of the mould, or they may consist of shorter sections. In the former case the advantage is gained that the ends of the side strainer plates abut on the ends of the mould, whereby unintentional movements of the side strainer plates are prevented.

In addition to the advantages initially mentioned, the further advantage is gained by means of a cheese mould according to the invention, that the effective breadth of the mould is easily alterable. It is merely necessary herefor to replace the guiding means disposed between the side strainer plates 6 and the body 1 of the mould by alternate means which have a width greater or smaller than that shown in the drawing.

We claim:

1. Improvement in a rectangular, large cheese mould, consisting of a box-like body and wherein the space intended for the cheese is confined by side strainer plates and bottom strainer plates so that a cheese bolster formed in the mould is supported at its bottom by said side strainer plates and laterally by said side strainer plates, and wherein one end of the mould has been constructed to constitute a door to which the bottom strainer plates and the cheese bolster resting thereon may be extracted from the mould, wherein the improvement comprises guiding means connecting said side strainer plates with said body and said guiding means arranged for forcing the side strainer plates to move away from the cheese bolster immediately as the cheese bolster is commenced to be withdrawn from the mold, said guiding means comprises slides attached to said side strainer plates and said slides having free ends which are obliquely outwardly directed in the direction pointing toward the door of the mould, and guides for which are affixed to the body of the mould.

2. Cheese mould according to claim 1, characterized in that the guides consist of two lateral guides and a bracket connecting these, which is affixed to the body of the mould and on the upper surface of which the slide rests.

3. Cheese mould according to claim 1, characterized in that the lower surface of the slide is obliquely ascending in the direction towards the free end of the slide.

* * * * *